United States Patent [19]

Segal et al.

[11] Patent Number: 4,961,641
[45] Date of Patent: Oct. 9, 1990

[54] SLIDE PROJECTOR WITH ERGONOMIC SLIDE SELECTION AND ACCESS

[76] Inventors: Leon Segal; Jonathan Bar-Or, both of 9 E. Hartwell Ct., Savoy, Ill. 61874

[21] Appl. No.: 443,721

[22] Filed: Nov. 29, 1989

[51] Int. Cl.$^5$ .................. G03B 21/12; G03B 21/64
[52] U.S. Cl. .................. 353/27 R; 353/21; 353/96; 353/120; 353/108; 353/103; 353/DIG. 5
[58] Field of Search .......... 353/27, 95, 96, 22-24, 353/120, 21, 103, 108, DIG. 5, 23, 122

[56] References Cited

U.S. PATENT DOCUMENTS

| | | |
|---|---|---|
| 2,250,174 | 7/1941 | Bancroft . |
| 2,431,662 | 11/1947 | Ralph .................. 353/27 R |
| 2,534,561 | 12/1950 | Silver . |
| 2,811,192 | 11/1951 | Holloway . |
| 3,457,007 | 7/1969 | Conroy . |
| 3,466,126 | 9/1969 | Sakamoto . |
| 3,606,528 | 9/1971 | Costanza .................. 353/21 |
| 3,759,487 | 9/1973 | Badalich . |
| 3,792,923 | 2/1974 | Pfeifer et al. .................. 353/27 R |
| 3,807,850 | 4/1974 | Ozeki . |
| 3,871,759 | 3/1975 | Crew . |
| 3,973,344 | 8/1976 | Frankel .................. 353/95 |
| 4,027,957 | 6/1977 | Shaw .................. 353/21 |
| 4,120,574 | 10/1978 | Hofmann et al. .................. 353/27 R |
| 4,133,605 | 1/1979 | Wiggin .................. 353/27 R |
| 4,184,754 | 1/1980 | Ozeki .................. 353/27 R |
| 4,353,646 | 10/1982 | Bartel et al. .................. 353/95 |
| 4,374,611 | 2/1983 | Hines .................. 353/27 R |
| 4,770,524 | 9/1988 | Staufield .................. 353/108 |

FOREIGN PATENT DOCUMENTS 2907522 9/1979 Fed. Rep. of Germany ...... 353/120

*Primary Examiner*—William A. Cuchlinski, Jr.
*Assistant Examiner*—William C. Dowling
*Attorney, Agent, or Firm*—Herbert Dubno

[57] ABSTRACT

A slide projector has a light table oriented at 60° to a generally horizontal base and connected thereto by a detachable connector. The light table has a tray mounted thereon for movement into mutually orthogonal directions parallel to the plane of the light table and supported by a counterweight, the tray receiving a planar slide holder whose slides and windows are alignable with a window in the light table. A projection lamp is located at the front side of the window while the projection optics are located at the rear side of the window.

7 Claims, 2 Drawing Sheets

SLIDE PROJECTOR WITH ERGONOMIC SLIDE SELECTION AND ACCESS

FIELD OF THE INVENTION

Our present invention relates in general, to slide projectors and, more particularly, to a slide projector with means for enabling the simultaneous previewing of all of the slides in a slide holder.

BACKGROUND OF THE INVENTION

Initially, the early slide projectors were fed one slide at a time. Subsequent improvements led to a cross-feed system in which the slides were fed from either side of the projector. Automatic cross-feeds for stacked slides was the next development in the projector art. Later on, magazines or cassette feeds were used to provide a slide storage system which operated in conjunction with the projector.

At the present time slides are stored in carousel trays or linear magazines, disposed either horizontally or vertically in the projector, in rectangular slide trays or in cubes. In each one of these storage systems, the slide has to be removed from its holder in order to preview or otherwise inspect the slide.

A system for previewing all of the slides of a set simultaneously is disclosed in U.S. Pat. No. 4,133,605 and comprises a rectangular light table having a substantially horizontal translucent surface illuminated by a projection bulb controlled by a shutter, which in one position allows a projection beam to be directed through a central transparent window in the surface and through a slide in registration therewith and above which there is positioned a lens and mirror assembly held by an arm mounted on a side of the light table for the projection of the image on the slide. The slide is one of several in a planar array held in a slide holder, the holder being moved across the surface to align different slides with the window, the surface being larger than the holder so that the entire slide holder always remains on the surface.

In another embodiment of this disclosure, the illuminated surface is arranged vertically on a base, with a projector lamp mounted on the base on one side of the surface and directing a light beam through the center thereof, where the light beam is received by a lens assembly mounted on the base on the other side of the illuminated surface in alignment with the projector lamp, whereby a slide interposed in the light beam is projected. As in the first embodiment, the illuminated surface is substantially larger than the slide holder.

Disadvantages associated with the first embodiment of the prior art relate to to the size of the light table being substantially larger than the slide holder, and further exaggerated by the arm mounted on the side of the table which holds the mirror and lens assembly, and the slide holder support mounted on the opposite side of the table. In addition, the table surface being substantially horizontal requires that the projectionist be standing in order to preview the slides. Still further, the single light source controlled by a shutter for both projection and illumination of the slides presents an added complexity.

Further disadvantages associated with the second embodiment of the prior art are again related to the illuminated surface being substantially larger than the slide holder and unitary with the base, making it difficult to transport the projection system.

OBJECTS OF THE INVENTION

It is the principal object of the present invention to provide an improved slide projector which is ergonomically suitable for use by the user in a sitting or standing position and is free from the drawbacks of earlier systems utilizing a planar format for the slides or depositaries.

Another object of the invention is to provide a compact projector which can be stored in a particularly convenient and efficient manner.

Another object of the invention is to provide a systematic solution to slide management, where slide storage, transportation, editing and presentation are all performed using the same planar format.

It is also an object of the invention to provide a highly compact, inexpensive, simple and aesthetically satisfying slide projector with improved viewing of all of the slides of the format and an ability to select among the slides for display with direct nonlinear access with greater ease of display.

SUMMARY OF THE INVENTION

These objects and others which will become more readily apparent hereinafter are attained, in accordance with the present invention with a slide projector utilizing a planar slide holder having a plurality of windows and adapted to accommodate respective slides in a planar format enabling the slide holder with the slides therein to be stored in a flat standard $8\frac{1}{2} \times 11$ or A4 filing system.

The projector of the invention can comprise a planar light table removably mounted upon a base and inclined at a 60° angle to the horizontal, i.e. a horizontal surface on which the base rests, so that the movement of the planar slide holder on this table can be effected with the user in a sitting position or in a standing position without discomfort to the user.

According to the feature of the invention, the means of attachment of the light table to the base is such that the detached parts can also be stored in a flat fashion, equally in a $8\frac{1}{2} \times 11$ or A4 standard filing system.

The planar slide holder can be received in a planar carriage tray movable on the light table so that the light table can illuminate all of the slides enabling selection of the slide to be shifted in the projecting position. A projecting lens and mirror assembly mounted on the back side of the light table in cooperation with the projection lamp mounted on the front side, ensures an erect projection of the image without lateral reversal so that the orientation of the slide corresponds to the orientation of the image.

The advantages of the system described are numerous. The projector, for example, provides simple and reliable manual operation enabling direct interaction between the user and the instrument much as is the case with an overhead projector.

All of the slides in the format can be displayed to the user during projection to reduce the workload during presentation.

The display of the slides during projection is in true orientation with top edge up and left side left.

The 60° inclination of the light table offers the user an ergonomical choice of either standing or sitting during presentation. The optics enables projection to a screen on the right hand side of the user in a particularly effective manner.

When the projection window is in the upper left hand corner of the light table, the projector enables a natural arrangement of the slides in the format with the first slide at the top left hand corner and the last slide at the bottom right hand corner.

The slide projector, more particularly, advantageously comprises:

a base;

a planar light table;

means for mounting the light table above the base at an inclination thereto and at an angle of about 60° to the horizontal, the table being formed with a single window;

a planar carriage tray formed with a first plurality of windows;

means for slidably mounting the carriage tray on a front side of the light table, the tray being displaceable parallel to the light table in any direction for bringing any of the first plurality of windows into registration with the single window;

a projection lamp mounted on the front side of the light table in registration with the single window for directing a beam of light therethrough perpendicular to the table;

a projection lens and mirror assembly mounted on a back side of the light table with the optical axis of the lens lying parallel thereto and the mirror in registration with the single window for receiving the beam of light and directing same to the lens; and a planar slide holder formed with a second plurality of windows and removably disposed in the carriage tray between the projection lamp and the tray, with the second plurality of windows in registration with the first plurality of windows, whereby the beam of light from the lamp traverses any slide brought into registration with the single window for the projection thereof, the illumination from the light table providing backlighting to any other slides in the slide holder for previewing thereof.

According to a feature of the invention, the means for slidably mounting the carriage tray on the light table comprises:

a first runner mounted on the front side of the light table and displaceable in the inclination direction thereof, the first runner being formed with a horizontally disposed first guide at a lower end thereof and displaceable therewith;

a horizontally disposed second guide mounted on the front side of the light table at an upper edge thereof;

a horizontally disposed second runner traversing the second guide and displaceable therein, the second runner being formed at one end with a third guide extending parallel to the first runner and displaceable with the second runner;

a horizontally disposed first track provided along a lower edge of a back side of the carriage tray and slidably engaged in the first guide;

a second track provided along an inclined edge of the back side of the carriage tray parallel to the first runner and slidably engaged in the third guide;

a horizontally disposed selection bar removably plugged into recesses provided at the lower edge of a front side of the carriage tray for manually moving the tray;

indexing means acting on the first and second tracks for providing tactile and audible feedback when any of the first plurality of windows is in registration with the single window during displacement of the tray; and a counterweight disposed on the back side of the light table and connected through a cable and pulley assembly to the first guide for balancing the weight of the carriage tray.

The indexing means can include a plurality of first spaced projections or bumps formed along the first track and coacting with at least one first recess or dimple formed in a facing surface of the first guide, and a plurality of second spaced projections or bumps formed on the second track and coacting with at least one second recess or dimple formed in a facing surface of the third guide.

The means for mounting the light table above the base can include a bracket mounted on the back side of the table and having a wedge-shaped tongue which fits under a flange mounted on the base and inclined complementary to the tongue, the flange and tongue being provided with electrical contacts for supplying power to the light table and the projection lamp.

Advantageously, the light table is illuminated by an electro-luminescent panel provided at the front side thereof and extending over the entire area of the light table, the single window traversing the panel. As previously noted, this single window can be formed at an upper left hand corner of the light table relative to a viewer facing the light table.

The slide holder can be formed with three holes along one edge thereof for mounting in a three-ring binder, the slide holder having substantially the same size and outline as the carriage tray and the carriage tray having substantially the same size and outline as the light table.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 3:
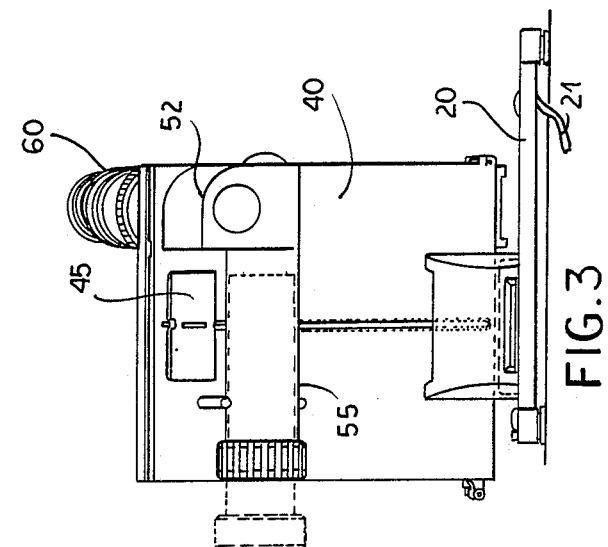
FIG. 3 is a rear elevational view of the slide projector.

The slide projector shown in FIGS. 1-5 operates with a slide holder 10 in the form of a semirigid frame structure having windows or openings 11 in a rectangular array, preferably an array of four such windows by five such windows as shown. A slide 12 is shown in place at the upper left hand window in one orientation of the slide field while a slide 13 is in place in the second position with its field oriented at right angles to the field of the first slide. The slides are conventional 35 millimeter slides. Each window 11 is associated with a frame 14 overlain by a pair of inwardly projecting ledges 15 which retain the slide in position when the slide is inserted into the pockets defined by these ledges in the direction of an arrow 16. Along one edge 17, holes 18 are provided to allow the planar slide holder with the slides thereon to be stored in a loose-leaf binder. The flat planar orientation of the slide holder enables the twenty slides carried by the latter to be stored in a conventional 8½×11 or A4 filing system.

Figure 2:
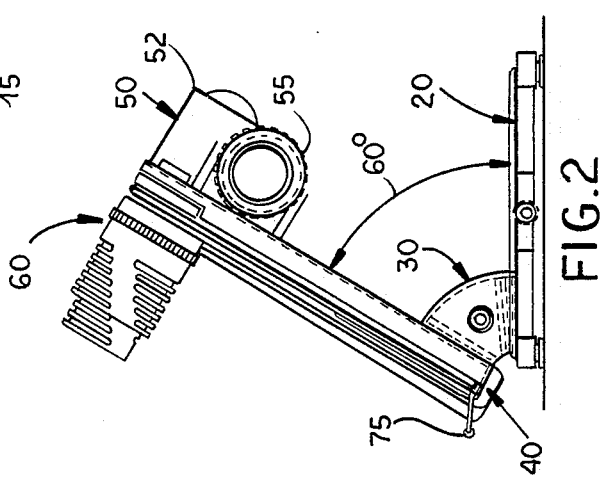
FIG. 2 is a side elevational view of the projector.
Figure 1:
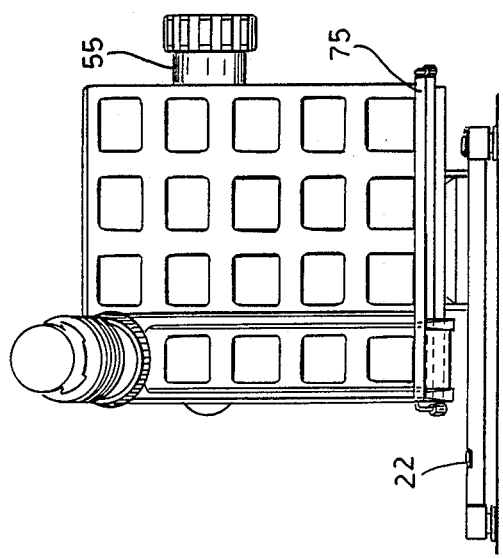
FIG. 1 is a front elevational view of a projector according to the invention.

As can be seen from FIGS. 1–3, the basic elements of the slide projector include a base 20, a light table 40, a means 30 for mounting the light table above the base at an angle of about 60° to the horizontal, an optical system 50 and a projection lamp assembly 60.

Figure 6:
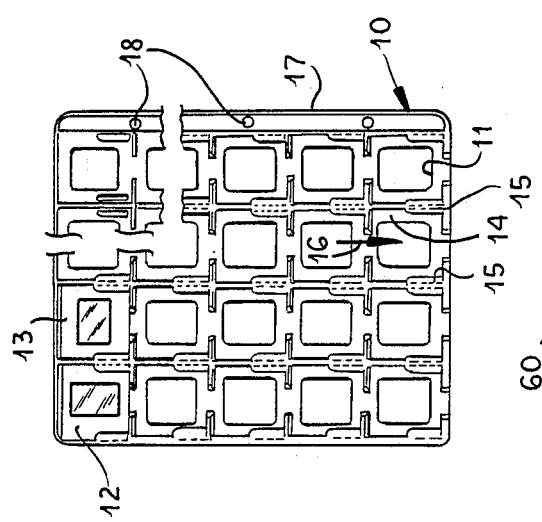
FIG. 6 is an elevational view showing the slide holder with two slides mounted therein.
Figure 4:
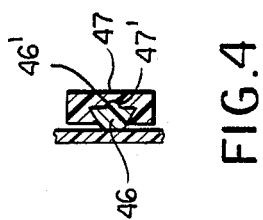
FIG. 4 is a cross sectional view illustrating the indexing means for the windows of the planar slide format and tray and the light table.

The light table 40 comprises an electro-luminescent panel 41 having a single window 42 therethrough at an upper left hand corner thereof and guides as will be described hereinafter for a planar carriage tray 70 removably mounted on the light table and adapted to receive the slide holder 10 shown in FIG. 6. More specifically, the tray 70 comprises frame members 71 defining a channel 72 into which the holder 10 can be inserted and provided with windows 73 registering with the windows 11 of the holder and, of course, with the single window 42 of the light table when the tray and holder are moved so that any particular window of the tray and holder can register with the single window 42.

On the underside of the frame members 71, guide bars 74 and 75 are provided and are received in channels 43 so that the tray can be removably mounted in the track and runner system which enables the displacement of the tray and holder to align any window of the tray and holder with the single window 42 of the light table.

The channels 43, for example, may be displaceable upwardly and downwardly along a path defined by the cable and pulley system 44 which is provided with a counterweight 45. The horizontal guides 43 are carried on a runner 46 which can be indexed by the means illustrated in FIG. 4. Here the runners 46 are shown to be guided in rail 47 and to have bumps or projections 46' which can register in recesses 47' of the rails each time a window of the tray and holder are aligned with the single window 42 as the tray and holder are shifted upwardly or downwardly. Similar indexing is provided between the tracks and rails for left to right or right to left shifting of the tray on the table.

The window 42 lies along an optical axis 51 of the lens system 50 and the projection lamp system 60.

The projecting lamp system can comprise an arm 61 which can be detached by its bracket 62 from the light table 40 for shipping and storage. When connected to the light table, however, the arm supports a ventilator housing 63 which can be provided around the lamp shield 64 receiving a projection lamp 65 and the usual condensing lenses or lamp lenses associated with a slide projector lamp. The electrical conductors for the lamp have not been illustrated but run through the arm 61 and are electrically connected with the light table 40 with the base as will be described below. A bar 76' has its ends 76 engageable in holes 77 of the tray to enable the tray to be readily movable upwardly and downwardly and from left to right or vice versa by either left handed or right handed users at will.

On the rear of the light table the housing 52 of the lens system is provided.

The optics include a mirror assembly 53 shown in diagrammatic form to consist of lenses 53a and mirrors 53b and 53c to provide image correction for the 60° light table slant and enable true orientation, i.e. erect and laterally nonreversed display of the image.

The housing 52 is provided along the outgoing light path with the usual barrel 54 and projection optics or objective 55 which can advantageously produce an optimal ratio of 4:1 viewing distance/image width.

Since the housing and barrel are attached to the rear of the light table, below the lower edge thereof, they form an especially compact system with the light table.

Figure 5:
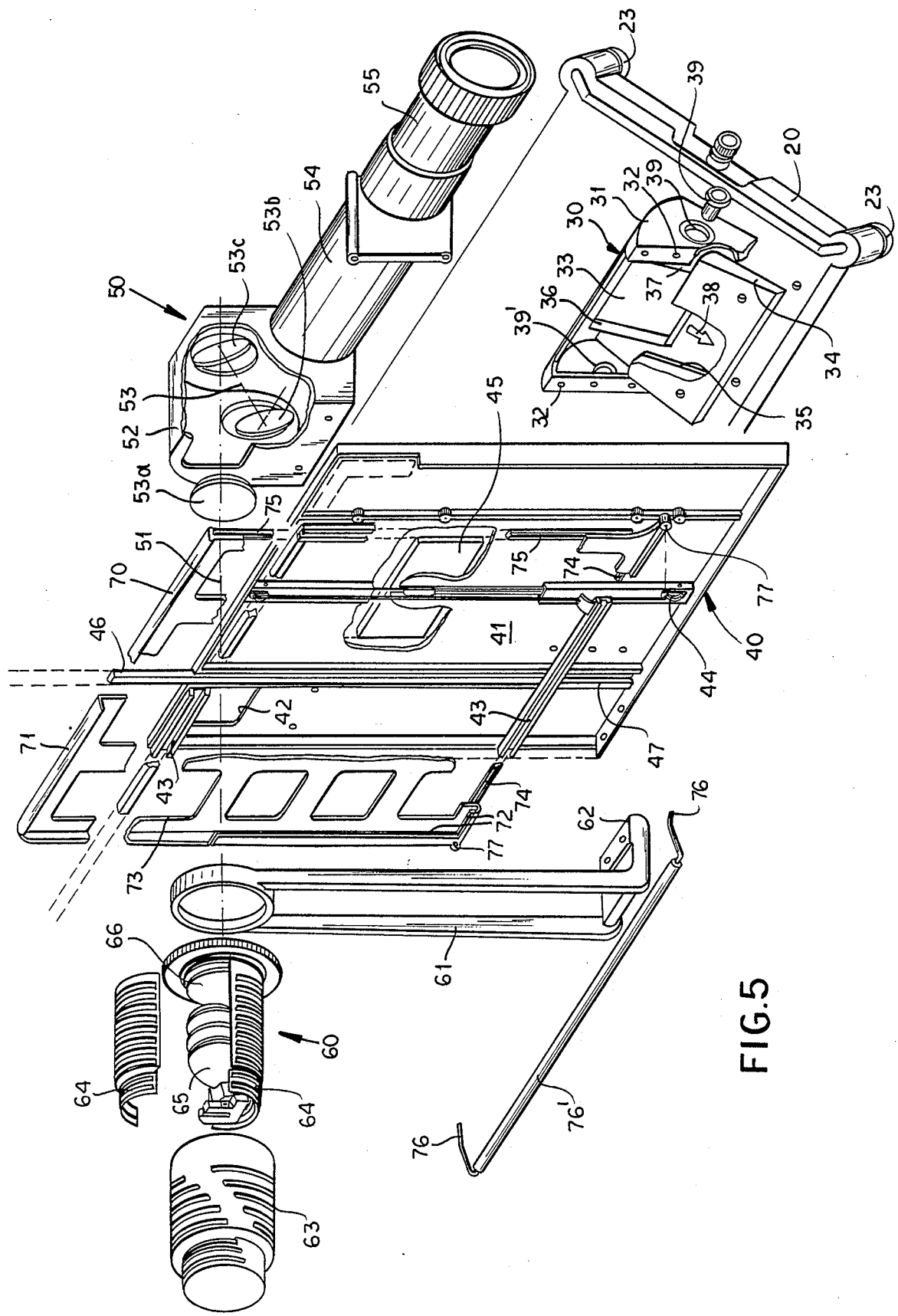
FIG. 5 is an exploded view illustrating various parts of the apparatus.

As can be seen from FIGS. 2, 3 and 5, the means 30 for mounting the light table 40 on the base 20 can include a bracket 31 which can be affixed by screws threaded into holes 32 to the rear of the light table 40. This bracket is formed with a wedge-shaped tongue 33 which engages in a wedge shaped casing 34 attached to the base 20 and provided with electrical conductors, one of which can be seen at 35 adapted to contact conductors 36 and 37 on the tongue 33 and make an electrical connection between the light table and the projection lamp and the electric current supply conductor 21 of the base. An on-off switch 22 can be provided on the base as well.

Once the tongue 33 has been inserted into the casing 34 in the direction of arrow 38, pines 39 can be inserted from opposite sides through holes 39' in the bracket 31 to lock the light table in the base.

The base 20 also has feet 23 at its corners, which can be extended or retracted to level the projector as desired.

In operation, once the switch 22 is turned on, the entire surface of the light table below the tray is illuminated so that, once a holder 10 is inserted into the tray, every slide can be viewed through the aligned windows of the holder and the tray from the light cast by the underlying electro-luminescent panel, except for the slide in the position of the window 42. That allows the user to select the next slide with ease.

By manipulation of the selection bar 76', the user can then shift the tray to bring any slide into alignment with the window 42 either by successively following a certain sequence and advancing the tray from right to left for each row or upwardly for each column, or by a combination of upward or downward and right to left movements, to present any slide to the window in a nonlinear access mode.

Once the slide display is terminated, the slide holder can be stored in a file as described without the need to remove the slides therefrom, since the holder is a relatively inexpensive item which need not be reused for another set of slides. If desired, the projector can be disassembled by simply withdrawing the pins 39 and disconnecting the quick release connector, thereby allowing the generally flat base and generally flat light table (assuming removal of the projector lamp assembly from its arm) also to be stored in a file cabinet or the like.

The tactile and audible indexing provided by the protuberances 46' which jump into the recesses 47' of the resilient rail and track members 46 and 47, which can be composed of a synthetic resin material permitting accurate indexing of a slide at the window 42 without trial and error methods and even for nonlinear access modes of operation.

The 60° angle of the light table vis-a-vis the base has been found to be a vast improvement over substantially horizontal tables which can only be used with considerable difficulty by a seated individual, and substantially vertical tables which can scarcely be used at all by a standing user.

We claim:

1. A slide projector comprising:
   a base;
   a planar light table;
   means for mounting said light table above said base at an inclination thereto and at an angle of about 60° to the horizontal, said table being formed with a single window;
   a planar carriage tray formed with a first plurality of windows;
   means for slidably mounting said carriage tray on a front side of said light table, said tray being displaceable parallel to said light table in any direction for bringing any of said first plurality of windows into registration With said single window;
   a projection lamp mounted on the front side of said light table in registration with said single window for directing a beam of light therethrough perpendicular to said table;
   a projection lens and mirror assembly mounted on a back side of said light table with the optical axis of said lens lying parallel thereto and said mirror in registration with said single window for receiving said beam of light and directing same to said lens; and
   a planar slide holder formed with a second plurality of windows and removably disposed in said carriage tray between said projection lamp and said tray, with said second plurality of windows in registration with said first plurality of windows, whereby said beam of light from said lamp traverses any slide brought into registration with said single window for the projection thereof, the illumination from said light table providing back-lighting to any other slides in said slide holder for previewing thereof.

2. The slide projector defined in claim 1, wherein said means for slidably mounting said carriage tray on said light table comprises:
   a first runner mounted on the front side of said light table and displaceable in the inclination direction thereof, said first runner being formed with a horizontally disposed first guide at a lower end thereof and displaceable therewith;
   a horizontally disposed second guide mounted on the front side of said light table at an upper edge thereof;
   a horizontally disposed second runner traversing said second guide and displaceable therein, said second runner being formed at one end with a third guide extending parallel to said first runner and displaceable with said second runner;
   a horizontally disposed first track provided along a lower edge of a back side of said carriage tray and 18 slidably engaged in said first guide;
   a second track provided along an inclined edge of the back side of said carriage tray parallel to said first runner and slidably engaged in said third guide;
   a horizontally disposed selection bar removably plugged into recesses provided at said lower edge of a front side of said carriage tray for manually moving said tray;
   indexing means acting on said first and second tracks for providing tactile and audible feedback when any of said first plurality of windows is in registration with said single window during displacement of said tray; and
   a counterweight disposed on the back side of said light table and connected through a cable and pulley assembly to said first guide for balancing the weight of said carriage tray.

3. The slide projector defined in claim 2 wherein said indexing means includes a plurality of first spaced projections or bumps formed along said first track and coacting with at least one first recess or dimple formed in a facing surface of said first guide, and a plurality of second spaced projections or bumps formed on said second track and coacting with at least one second recess or dimple formed in a facing surface of said third guide.

4. The slide projector defined in claim 1 wherein said means for mounting said light table above said base includes a bracket mounted on the back side of said table and having a wedge-shaped tongue which fits under a flange mounted on said base and inclined complementary to said tongue, said flange and said tongue being provided with electrical contacts for supplying power to said light table and said projection lamp.

5. The slide projector defined in claim 1 wherein said light table is illuminated by an electro-luminescent panel provided at the front side thereof and extending over the entire area of said table, said single window traversing said panel.

6. The slide projector defined in claim 1 wherein said single window is formed at an upper corner of said light table.

7. The slide projector defined in claim 1 wherein said slide holder is formed with three holes along one side thereof for mounting in a three-ring binder, said slide holder having substantially the same size and outline as said carriage tray, and said carriage tray having the same size and outline as said light table.

* * * * *